US012591336B2

(12) United States Patent
Barel

(10) Patent No.: US 12,591,336 B2
(45) Date of Patent: Mar. 31, 2026

(54) DISPLAY FLICKER MITIGATION VIA AMBIENT LIGHT SENSOR

(71) Applicant: Microsoft Technology Licensing, LLC, Redmond, WA (US)

(72) Inventor: Eliyahu Barel, Rosh-HaAyin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/655,144

(22) Filed: May 3, 2024

(65) Prior Publication Data

US 2025/0341919 A1 Nov. 6, 2025

(51) Int. Cl.
| | |
|---|---|
| *G06F 3/041* | (2006.01) |
| *G06F 3/044* | (2006.01) |
| *G09G 5/10* | (2006.01) |

(52) U.S. Cl.
CPC ...... *G06F 3/04184* (2019.05); *G06F 3/04162* (2019.05); *G06F 3/0441* (2019.05); *G09G 5/10* (2013.01); *G09G 2320/0247* (2013.01); *G09G 2360/145* (2013.01)

(58) Field of Classification Search
CPC ............. G06F 3/04184; G06F 3/04162; G06F 3/0441; G09G 5/10; G09G 2320/0247; G09G 2360/145
See application file for complete search history.

(56) References Cited

U.S. PATENT DOCUMENTS

| | | |
|---|---|---|
| 11,776,101 B1 | 10/2023 | Lee |
| 11,836,318 B1 | 12/2023 | Siaw |
| 2010/0045859 A1 | 2/2010 | Starr |
| 2015/0002471 A1* | 1/2015 | Mankowski .......... G06F 3/0416 345/175 |
| 2016/0086574 A1* | 3/2016 | Buckley .............. G09G 3/3413 345/690 |
| 2018/0059868 A1 | 3/2018 | Brahma et al. |
| 2024/0046887 A1 | 2/2024 | Park |

FOREIGN PATENT DOCUMENTS

| | | |
|---|---|---|
| CN | 109271061 A | 1/2019 |
| CN | 110413141 B | 7/2023 |
| CN | 116501195 A | 7/2023 |
| EP | 4332951 A1 | 3/2024 |

OTHER PUBLICATIONS

Extended European Search Report received for EP Application No. 25173178.2, mailed on Sep. 17, 2025, 10 pages.

* cited by examiner

*Primary Examiner* — Adam R. Giesy
(74) *Attorney, Agent, or Firm* — Alleman Hall LLP

(57) ABSTRACT

A method for display flicker mitigation includes, at an ambient light sensor (ALS) of a touch-sensitive display device, detecting a display flicker condition affecting a touch-sensitive display of the touch-sensitive display device. One or more flicker mitigation operations are applied to alleviate the display flicker condition based at least in part on one or more flicker mitigation parameters.

20 Claims, 8 Drawing Sheets

300

DISPLAY FLICKER MITIGATION VIA AMBIENT LIGHT SENSOR

BACKGROUND

Display devices may sometimes be afflicted by display flicker, manifesting as rapid fluctuations in display brightness. Such flickering can have a variety of different causes depending on the scenario.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for display flicker mitigation includes, at an ambient light sensor (ALS) of a touch-sensitive display device, detecting a display flicker condition affecting a touch-sensitive display of the touch-sensitive display device. One or more flicker mitigation operations are applied to alleviate the display flicker condition based at least in part on one or more flicker mitigation parameters.

DETAILED DESCRIPTION

Display devices may be afflicted by undesirable display flicker in various scenarios. This can in some cases be related to the operation of a touch sensor of a touch-sensitive display device. Additionally, or alternatively, display flicker can be related to data communication with one or more external devices, such as an active stylus used with a touch-sensitive display. Successfully detecting and mitigating such display flickering can be challenging, often requiring external calibration equipment.

Accordingly, the present disclosure is directed to techniques for display flicker detection and mitigation. Specifically, according to the present disclosure, a touch-sensitive display device includes an ambient light sensor (ALS). The ALS may in some cases be disposed beneath a touch-sensitive display of the touch-sensitive display device—e.g., as part of an under-display camera module. The ALS is used to detect a display flicker condition affecting the touch-sensitive display. The touch-sensitive display device then applies one or more flicker mitigation operations to alleviate the display flicker condition. This can include, for instance, changing the electrical behavior of one or more display electrodes of the touch-sensitive display, in a manner based on one or more flicker mitigation parameters, such as display size, detected device proximity, touch input position, etc.

In this manner, the techniques described herein beneficially improve the functioning of a touch-sensitive display device, by providing a simpler and more efficient process of detecting and mitigating display flicker. This furthermore improves human-computer interaction, as the user is not distracted by unsightly display flickering and does not need to manually perform display calibrations to correct for such flickering.

Figure 1:
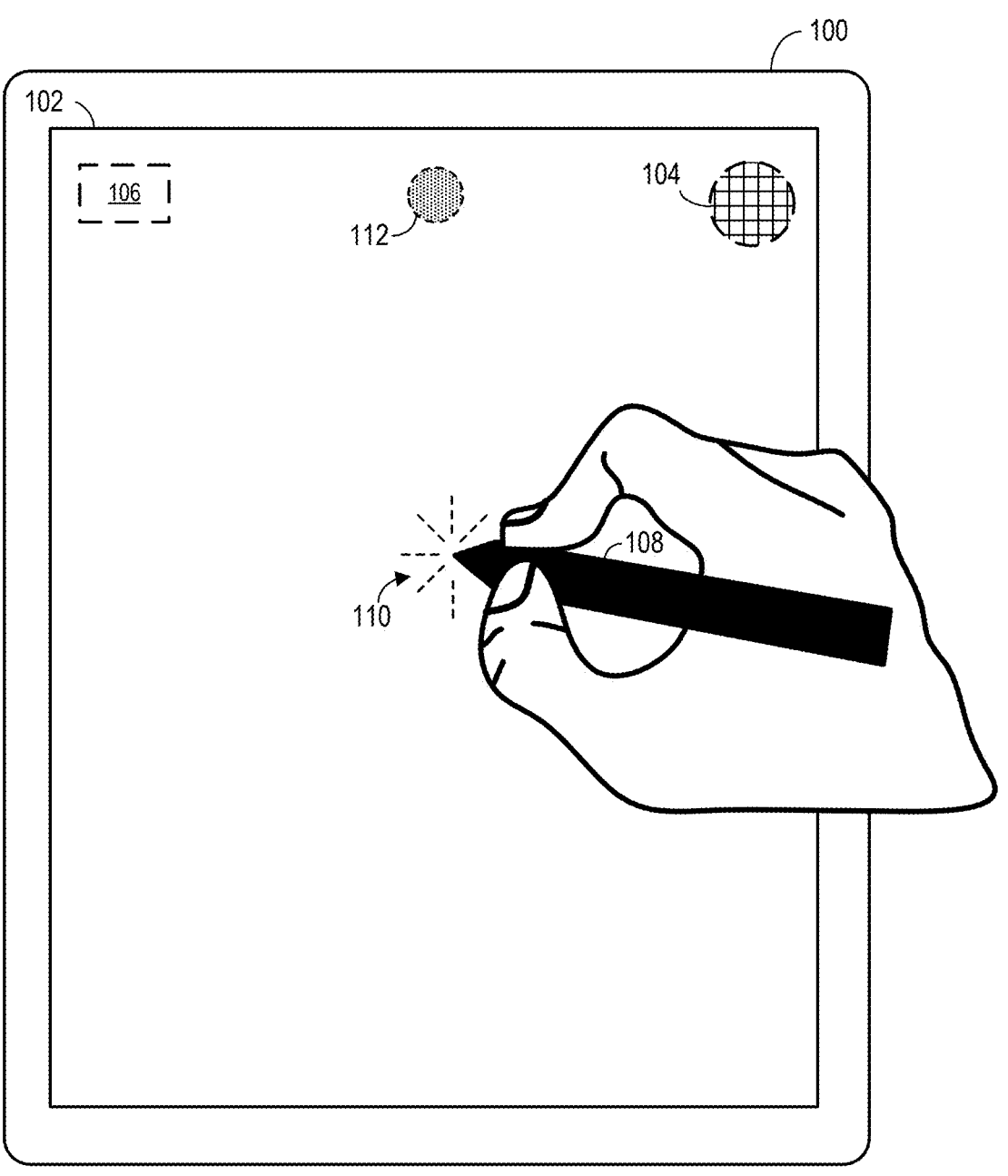
FIG. 1 schematically illustrates the use of an example touch-sensitive display device.

FIG. 1 schematically illustrates use of an example touch-sensitive display device 100. In this example, the touch-sensitive display device takes the form of a handheld tablet computer. However, it will be understood that this is non-limiting. As other examples, touch-sensitive display devices can include smartphones, laptop displays, computer monitors, collaborative productivity devices (e.g., smart whiteboards), etc. In general, a "touch-sensitive display device" may have any suitable capabilities, hardware configuration, and form factor. In some examples, touch-sensitive display device 100 may be implemented as computing system 800 described below with respect to FIG. 8.

As shown, touch-sensitive display device 100 includes a touch-sensitive display 102. The display may have any suitable size and properties. For instance, the display may have any suitable pixel resolution, color gamut, refresh rate, brightness, touch-sensing capabilities, etc. In this example, the touch-sensitive display includes a plurality of display electrodes 104, represented as a grid pattern disposed beneath the display surface. In general, any suitable technologies may be used to implement touch-sensing capabilities at the touch-sensitive display device. For instance, the touch-sensitive display may integrate a capacitive touch sensor, projected capacitive touch sensor, resistive touch sensor, infrared grid touch sensor, etc. Furthermore, while the present disclosure primarily focuses on display devices that are touch-sensitive, it will be understood that, in some examples, the techniques described herein may be applicable to mitigating flicker affecting displays that are not touch-sensitive.

Touch-sensitive display device 100 includes a controller 106. The controller may be configured to perform any or all of the flicker detection and mitigation techniques described herein. For instance, the controller may be communicatively coupled with the touch sensor, the touch-sensitive display, an ALS, data communication hardware, etc., and may be configured to control the operations of any or all of such components. The controller is implemented as any suitable combination of one or more computer logic components. In some examples, controller 106 may be implemented as logic subsystem 802 described below with respect to FIG. 8.

In this example, a stylus 108 is being used to provide touch input to the touch-sensitive display device. In some examples, the stylus may take the form of an active stylus, which includes integrated computer components and is configured to exchange data with the touch-sensitive display device. Additionally, or alternatively, touch input may be provided to the touch-sensitive display device using a passive stylus (e.g., a stylus that lacks internal electronic components), and/or other suitable input objects, such as human digits. As shown, proximity of the stylus to the touch-sensitive display is causing a display flicker condition, simplistically represented in FIG. 1 as display flicker condition 110.

It will be understood that display flicker may have any suitable cause and appearance. In some examples, display flicker may be related to the operation of a touch sensor of the touch-sensitive display. For instance, electromagnetic conditions caused by proximity of a conductive object to the touch sensor can influence the display circuitry in a manner that causes display flicker. Some touch-sensitive displays, especially those using capacitive touch technology, operate by detecting changes in the electrical field across the display. When an input object touches the screen, the physical contact alters the electrical field. This alteration can introduce noise or interference if the frequencies used for touch sensing are close to the frequencies used by other components of the display, such as the backlight or the display driver circuits. Similarly, in some cases, the signals used to detect touch can couple with the signals driving the display elements, leading to flicker. This is particularly true for devices where the touch sensors and display circuits are closely integrated without significant electromagnetic isolation.

Additionally, or alternatively, display flicker may be related to transmission of data from the touch-sensitive display to a separate device. For instance, in some examples, the touch-sensitive display includes a plurality of display electrodes used to transmit a data uplink signal to a separate active stylus. This electrical activity can contribute to display flicker. In other words, active styluses (and/or other suitable accessory devices) often communicate with the display via electromagnetic signals. When a stylus is used to write or draw on a touch-sensitive display, it frequently sends and receives signals to and from the touchscreen controller. These signals can inadvertently couple with the display electronics, particularly if the frequencies used for communication overlap with those used by the display's electronics. This coupling can lead to electromagnetic interference with the signals that control the display pixels, particularly in displays like organic light emitting diodes (OLEDs) or liquid crystal displays (LCDs) that use precise timing and voltage control to manage pixel states. The interference can manifest as visual artifacts, including flicker.

It will be understood that these potential sources of display flicker are non-limiting examples. As additional examples, display flicker may be caused by common voltage (VCOM) instability, refresh rate mismatches, hardware faults, etc., and the techniques described herein may be beneficially applied to any suitable type of detected display flicker, having any suitable cause.

Furthermore, display flicker may manifest in any suitable way. As non-limiting examples, display flicker may be characterized as horizontal line (H-line) flickering, referring to flicker that appears as horizontal lines across the display, and/or spatial flickering, which refers to flicker that affects larger areas of the display or appears as random flickering across the screen. H-line flickering may, for instance, be caused by electrical interference and/or display refresh synchronization issues, while spatial flickering may be caused by coupling between display layers, display panel defects or non-uniformities, and/or other suitable causes.

In any case, such display flickering may be detected by an ALS of the touch-sensitive display device. In the example of FIG. 1, touch-sensitive display device 100 includes ALS 112. The ALS takes the form of any suitable hardware component useable for detecting ambient light conditions in the local environment of the touch-sensitive display device. In the example of FIG. 1, ALS 112 is disposed beneath the surface of the touch-sensitive display. For instance, the ALS may be included as part of an under-display camera module. In other examples, the ALS may have any other suitable position with respect to the touch-sensitive display device— e.g., the ALS may be disposed within a display bezel. In some examples, the integration time of the ALS is dynamically controllable. For instance, different integration times may be used depending on whether the ALS is operating in a flicker detection or ambient light detection mode, as will be described in more detail below.

The ALS detects display flicker in any suitable way. In some examples, depending on the positioning of the ALS with respect to the rest of the touch-sensitive display device, some amount of display light emitted by the touch-sensitive display may be detectable by the ALS. For instance, in the example of FIG. 1, some amount of light emitted by the touch-sensitive display may bleed through the display layer and be detected at the ALS. In normal operation, the amount of detected light will remain relatively stable over time, when adjusted for ambient light conditions. When display flicker occurs, such flickering may be detectable as acute fluctuations in the light detected at the ALS. For instance, the controller may define certain prerequisite conditions (e.g., a certain variance in detected light occurring in less than a threshold period of time), and detect that a display flicker condition is affecting the touch-sensitive display device upon detecting that such prerequisite conditions are met. These prerequisite conditions may be defined by any suitable threshold values depending on the implementation— e.g., depending on the specific capabilities of the touch-sensitive display, the ALS, and the amount of ambient light in the environment.

Figure 2:
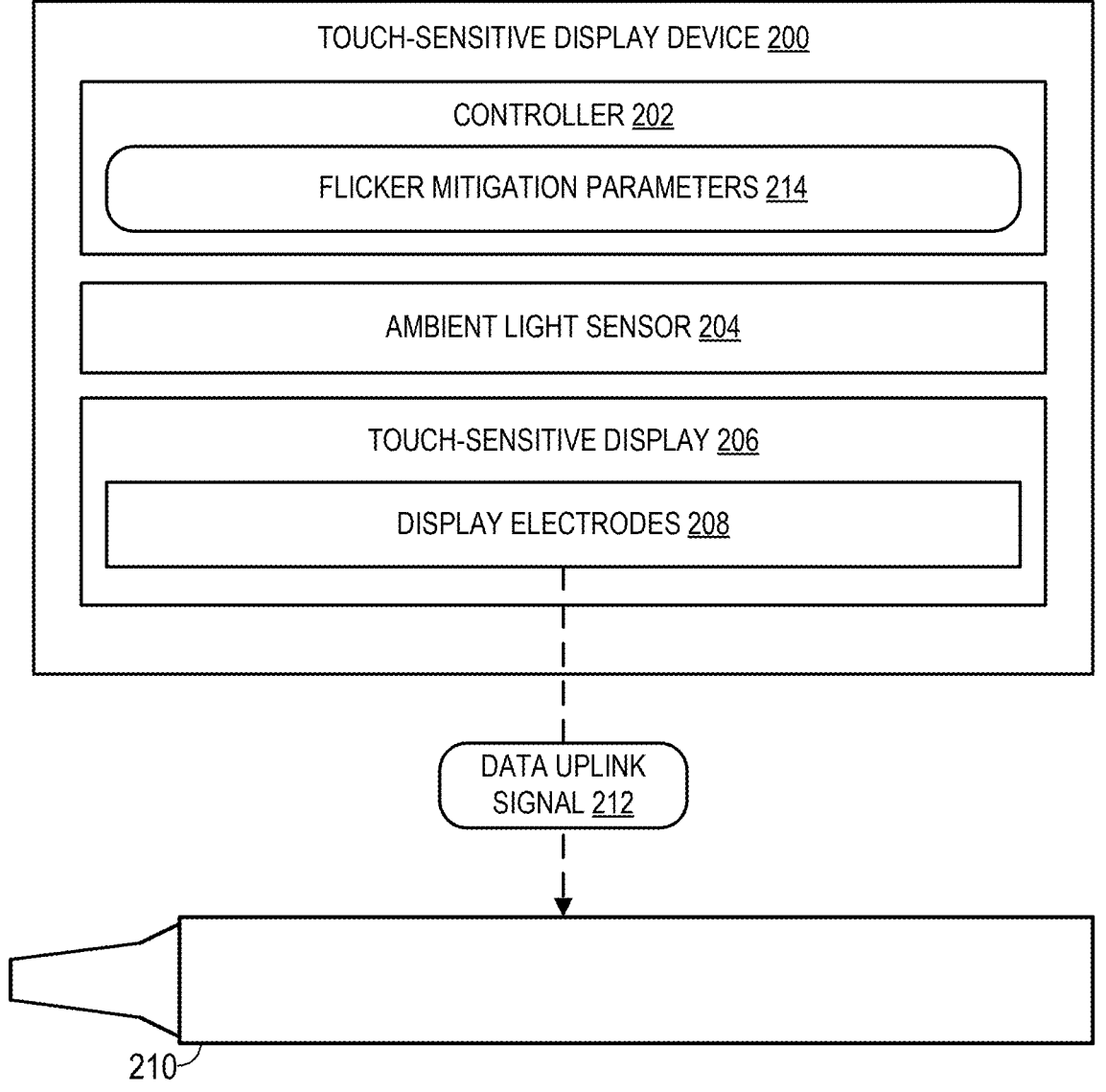
FIG. 2 schematically illustrates data communication between a touch-sensitive display device and an example active stylus.

FIG. 2 schematically depicts another example touch-sensitive display device 200. Similar to touch-sensitive display device 100, touch-sensitive display device 200 includes a controller 202, an ALS 204, and a touch-sensitive display 206. The touch-sensitive display includes a plurality of display electrodes 208. These may include electrodes used to implement touch-sensing functionality of the touch-sensitive display, facilitate data communication with one or more external devices, and/or provide any other suitable functions. In some cases, different electrodes are used to provide touch-sensing and data communication. Additionally, or alternatively, the same set of electrodes may be used to provide both functions—e.g., data may be transmitted to an external device by modulating electrical signals supplied to touch-sensing electrodes to thereby encode data in a manner that is detectable by the external device.

In the example of FIG. 2, the touch-sensitive display device is being used with an example active stylus 210. To this end, the touch-sensitive display device is transmitting a data uplink signal 212 to the active stylus. This may include any suitable data—e.g., data relating to haptic feedback, current software application settings, user preferences settings, etc. The data uplink signal may be transmitted to the active stylus in any suitable way, using any suitable data communication interface of the touch-sensitive display device. For instance, the data uplink signal may be transmitted by the plurality of display electrodes of the touch-sensitive display.

However, use of the active stylus may contribute to display flicker at the touch-sensitive display, as discussed above. To this end, the touch-sensitive display device applies one or more flicker mitigation operations to alleviate the display flicker condition. Various non-limiting examples of different flicker mitigation operations will be described in more detail below. The flicker mitigation operations are applied based at least in part on a plurality of flicker mitigation parameters 214, which refer to any suitable parameters detectable by the touch-sensitive display device that are relevant to mitigating display flicker. As non-limiting examples, the flicker mitigation parameters may be selected from a group including a size of the touch-sensitive display, a displayed image color of the touch-sensitive display, detected presence of an active stylus in proximity to the touch-sensitive display, and a detected position of a touch input to the touch-sensitive display.

Detection and mitigation of display flicker may occur at any suitable time while the touch-sensitive display device is active. In some scenarios, the techniques described herein may be applied in a factory calibration scenario. For instance, new touch-sensitive display devices may be used in an environment with controlled lighting conditions (e.g., a dark room), which can make flicker easier to detect at the ALS. Any detected flicker can then be addressed through one or more of the flicker mitigation operations to be described below. Additionally, or alternatively, flicker detection and mitigation may occur during normal use of the touch-sensitive display device by an end user. For instance, it may be relatively easier to detect flicker, and subsequently apply flicker mitigation operations, when ambient lighting conditions are low, such as nighttime while the user is sleeping. In some examples, flicker detection and mitigation may occur at any arbitrary time while the touch-sensitive display device is active regardless of ambient lighting conditions.

Figure 3:
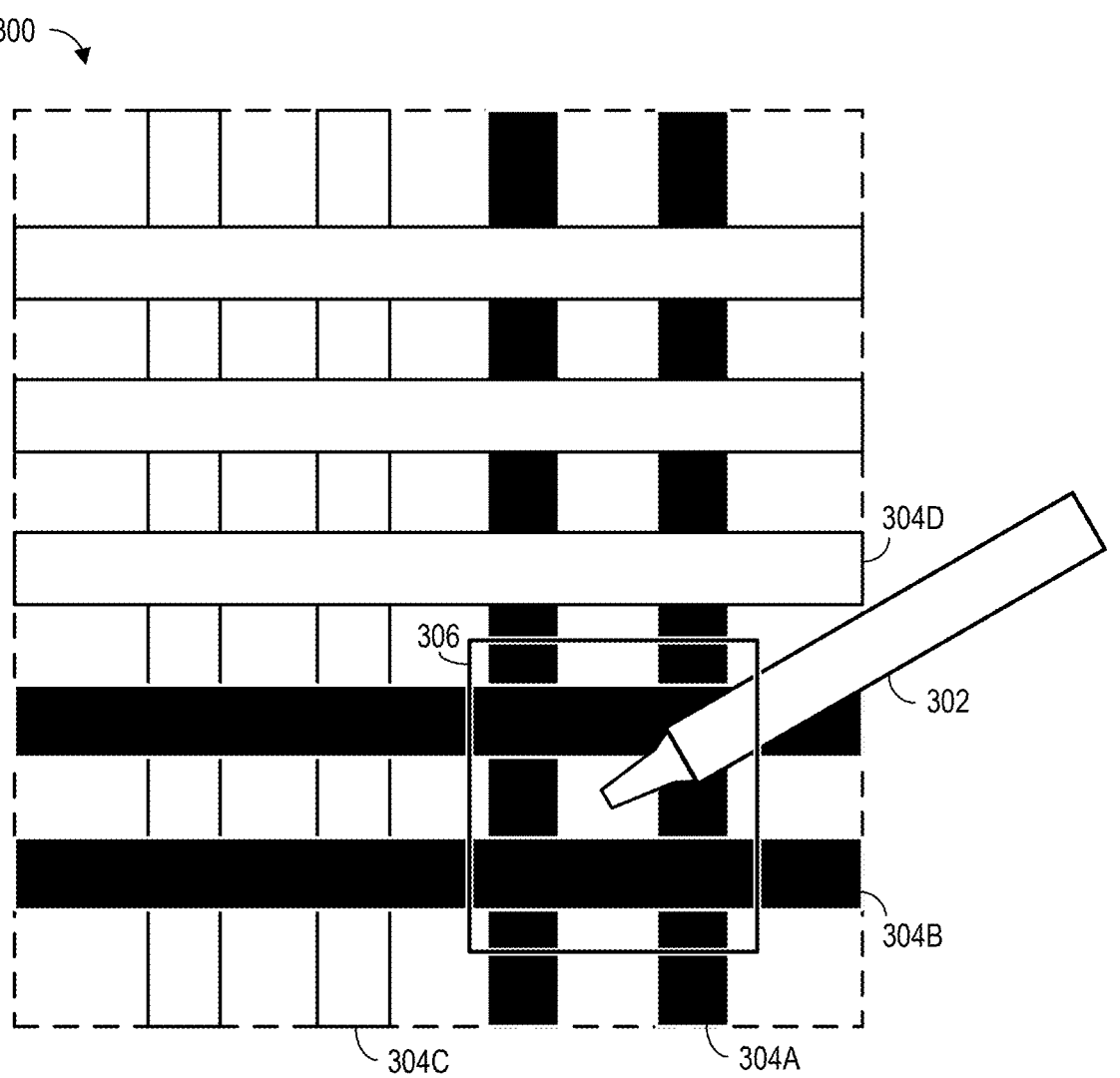
FIG. 3 schematically depicts an example flicker mitigation operation applied to a plurality of display electrodes of a touch-sensitive display.

One example flicker mitigation scenario is schematically depicted with respect to FIG. 3. Specifically, FIG. 3 schematically shows an example plurality of display electrodes 300 of a touch-sensitive display. In this example, the display electrodes take the form of conductive strips (e.g., constructed from indium tin oxide, or another suitable material), including a plurality of horizontal electrodes and an orthogonal plurality of vertical electrodes. In some examples, the display electrodes may be disposed in separate electrode layers, as will be described in more detail below. It will be understood that the arrangement shown in FIG. 3, as well as the other FIGS. 4A, 4B, and 5 that will be described in more detail below, are highly simplified and provided only for the sake of illustration. In other examples, a touch-sensitive display device may use any suitable type and arrangement of display electrodes for providing touch-sensing and/or data communication functionality.

In the example of FIG. 3, a stylus 302 is positioned in proximity to the plurality of display electrodes. It will be understood that a display surface may be disposed between the display electrodes and the stylus tip, although this is omitted in FIG. 3 to better illustrate operation of the display electrodes. In FIG. 3, the display electrodes are used to detect touch input from the stylus and/or other input objects—for example, when an input object approaches the touch screen, it disturbs the electrostatic field created by the grid of electrodes. In the case of capacitive touch sensors, this disturbance changes the capacitance at the point of contact. Each intersection of the row and column electrodes acts as a capacitor, and the presence of the input object alters the capacitance at these points. The controller applies a voltage to the column electrodes (or row electrodes) sequentially and measures the charge transferred through the row electrodes (or column electrodes). The presence of an input object near the electrode grid changes the amount of charge transferred, which is detected by the controller to determine the location of the touch.

Furthermore, in FIG. 3, the plurality of display electrodes are used to facilitate data communication with the stylus. For instance, data may be transmitted by applying a modulated electrical signal to one or more of the plurality electrodes, which then affects local electromagnetic conditions in a manner determined by the modulated signal. By encoding data in the modulated signal, such data can be electrostatically transmitted to any nearby devices capable of detecting such changes in electromagnetic conditions. For example, an active stylus may include a stylus electrode that detects the change in electromagnetic conditions, and readings at the stylus electrode may be interpreted by an on-board stylus controller to recover the original data.

As discussed above, however, use of the display electrodes to detect touch input and/or transmit data to the active stylus can contribute to display flicker. Thus, in the example of FIG. 3, the touch sensitive display device applies a flicker mitigation operation by reducing a voltage used for transmission of the data uplink signal at one or more of the plurality of display electrodes having positions greater than a threshold distance from the detected position of the active stylus. Thus, in this example, the detected position of the active stylus (e.g., as reported by the touch sensor) may be considered as a flicker mitigation parameter, as discussed above. This beneficially conserves electrical power that would ordinarily be used by electrodes that are relatively distant from the position of the stylus, without compromising the ability of the stylus to communicate with the display device.

This is schematically illustrated with respect to FIG. 3, where several of the display electrodes are labeled as electrodes 304A, 304B, 304C, and 304D. Display electrodes 304A and 304B are colored black to indicate that they are being used to transmit a data uplink signal to the stylus with a typical voltage—e.g., a voltage level that would ordinarily be used at each electrode of the plurality of electrodes. By contrast, electrodes 304C and 304D, along with the other display electrodes 300 visible in FIG. 3, are colored white to indicate that the voltage used to transmit the data uplink signal at those electrodes has been reduced. This may in some cases include discontinuing transmission of the data uplink signal at one or more of the display electrodes. Such a reduction in the voltage used for signal transmission can beneficially reduce or alleviate a detected display flicker condition.

The number of electrodes at which signal transmission voltage is reduced may be determined in any suitable way. In the example of FIG. 3, electrodes 304A and 304B continue transmitting the data uplink signal with typical voltage, as these electrodes are less than a threshold distance 306 from the current position of the stylus. Electrodes that are not within the threshold distance 306 of the stylus transmit the data uplink signal with reduced voltage, or discontinue signal transmission altogether. Any suitable threshold may be used depending on the implementation—e.g., to balance signal strength against the desired degree of flicker mitigation.

Figure 4A:
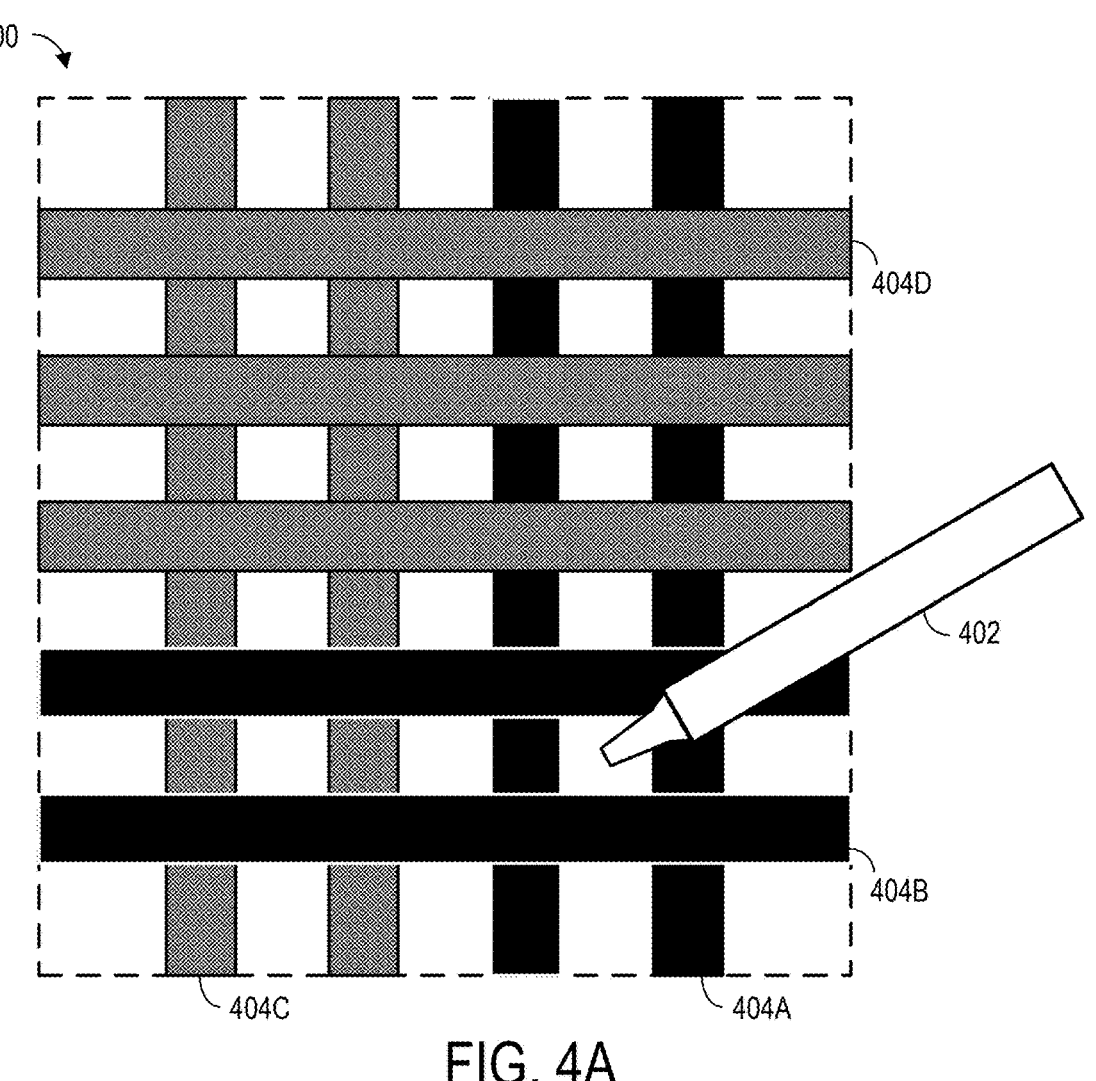
FIGS. 4A and 4B schematically depict another example flicker mitigation operation applied to a plurality of display electrodes of a touch-sensitive display.
Figure 4B:
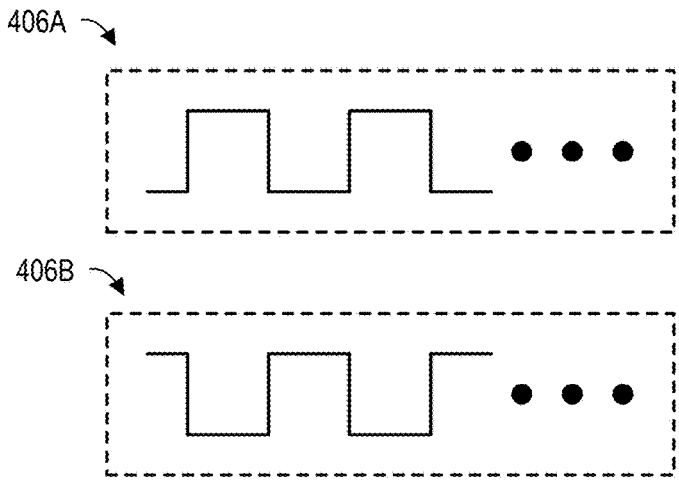

Another example flicker mitigation operation is schematically illustrated with respect to FIGS. 4A and 4B. FIG. 4A schematically depicts another example plurality of display electrodes 400, used with an active stylus 402. Several of the display electrodes are labeled as electrodes 404A, 404B, 404C, and 404D. In this example, the flicker mitigation operation includes driving a subset of the display electrodes with a second signal having an opposite phase from the data uplink signal. This can beneficially reduce or alleviate a detected display flicker condition.

Specifically, as shown, display electrodes 404A and 404B are colored black to indicate that they are transmitting the data uplink signal to the active stylus. By contrast, electrodes 404C and 404D are colored with a grey fill pattern to indicate that they transmit a second signal having an opposite phase from the data uplink signal. This is simplistically represented in FIG. 4B, showing an example data uplink signal 406A, and a second signal 406B having an opposite phase from the data uplink signal.

The quantity of the subset of display electrodes driven with the second signal may be determined based at least in part on the one or more flicker mitigation parameters—e.g., the position of the stylus, the size of the display, properties of the data uplink signal, properties of the detected flicker condition, etc. Use of an opposite phase signal at some display electrodes can beneficially reduce display flickering, as the electromagnetic fields generated by these opposite-phase signals can effectively cancel out the fields created by the uplink signals. This may have the effect of reducing the overall electromagnetic interference experienced by the display circuits, and this reduction in interference minimizes the unwanted voltage fluctuations and, thus, reduces or eliminates flicker. Use of the flicker mitigation parameters to identify the subset of electrodes for which the opposite-phase signals are used can beneficially tune the electromagnetic conditions generated by the display electrodes in a manner that still enables data transmission with the stylus, while reducing potential flicker.

It will be understood that the scenario depicted in FIG. 4A is non-limiting, and that the display electrodes need not be limited to the two behaviors discussed above. For instance, as with FIG. 3, some number of display electrodes may be used to transmit the data uplink signal with a reduced voltage, used to transmit the opposite-phase signal with reduced voltage, or may not be driven with encoded signals at all.

Figure 5:
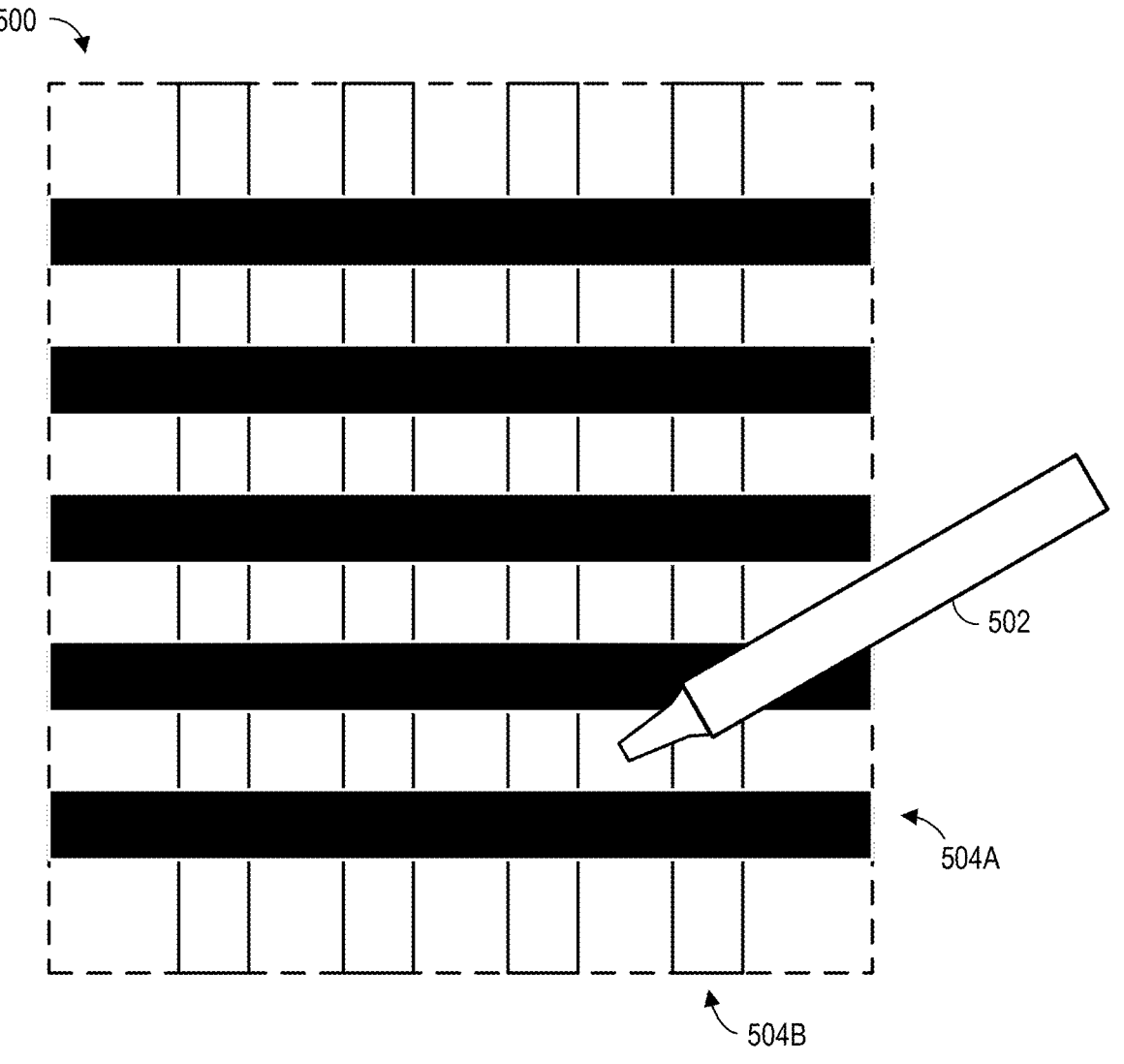
FIG. 5 schematically depicts another example flicker mitigation operation applied to a plurality of display electrodes of a touch-sensitive display.

Another example flicker mitigation operation is schematically illustrated with respect to FIG. 5. Specifically, FIG. 5 schematically shows another example plurality of display electrodes 500, which are interacting with an active stylus 502. In this example, the display electrodes are divided into two or more different layers, including an upper electrode layer 504A (e.g., display electrodes colored black), and a lower electrode layer 504B (e.g., display electrodes colored white). While in this example, the horizontal electrodes are disposed in the upper layer and the vertical electrodes are disposed in the lower layer, it will be understood that this is non-limiting. Rather, touch-sensitive display devices as described herein may include any suitable number of different layers of display electrodes, and the electrodes disposed within each layer may have any suitable orientations.

Display flickering can beneficially be mitigated by driving display electrodes of one layer with the data uplink signal, while reducing the voltage of display electrodes of the other layer, or setting such electrodes to electrical ground. In one example scenario, the flicker mitigation operation includes driving display electrodes of the upper electrode layer with the data uplink signal, while setting display electrodes of the lower electrode layer to an electrical ground of the touch-sensitive display device. This may beneficially reduce or alleviate a detected display flicker condition. For instance, grounding one layer of electrodes can act as a shield to block or absorb unwanted electromagnetic interference that can cause flicker. This EMI can come from internal components of the device or external sources. The grounded layer may dissipate these interfering signals away from the active display components that control pixel behavior.

Figure 6:
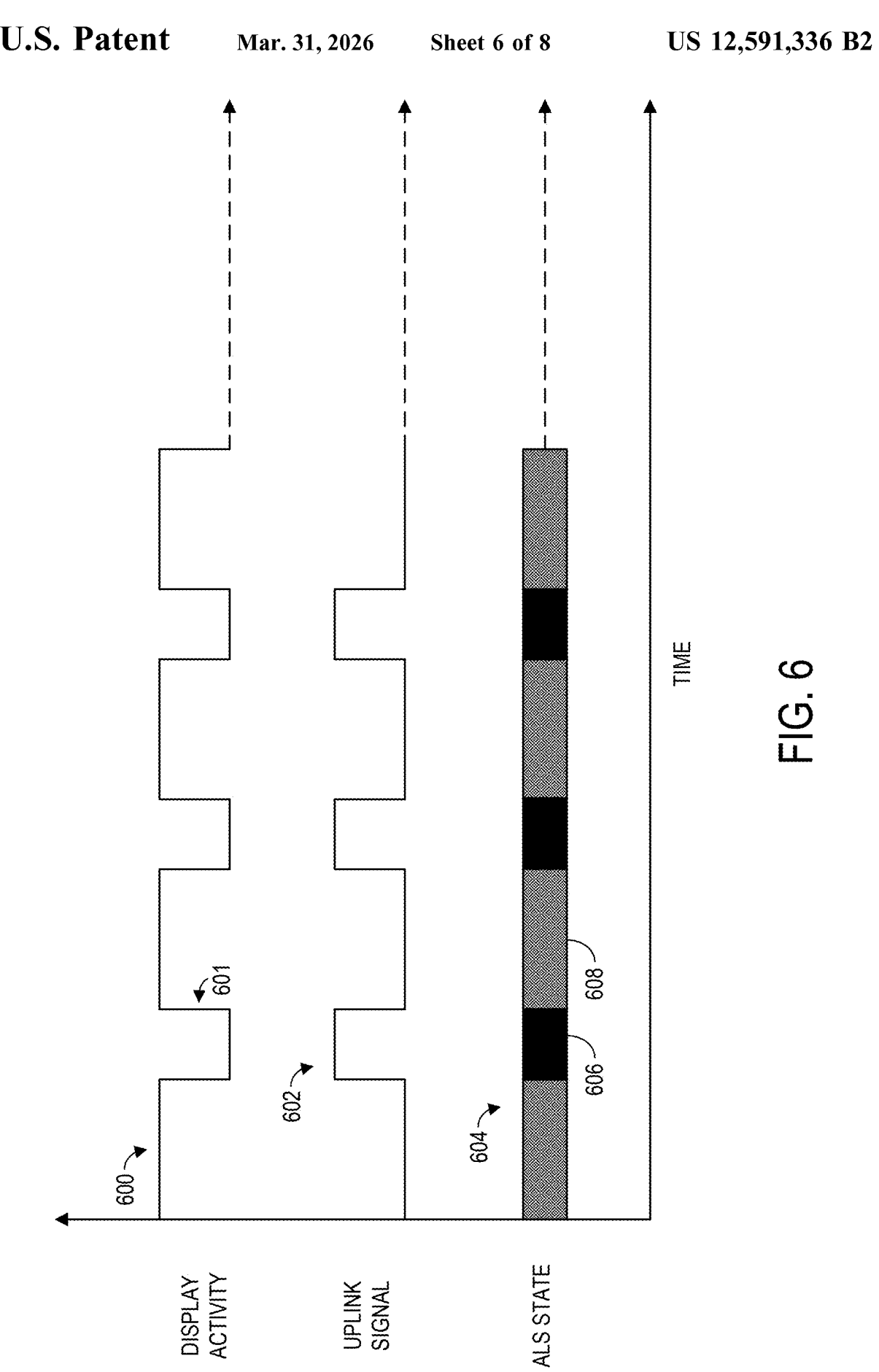
FIG. 6 illustrates the activity of different components of an example touch-sensitive display device over time.

In some examples, data transmission and operation of the ALS may vary depending on whether the touch-sensitive display is actively emitting display light, or in a display blanking period. This is illustrated with more detail in FIG. 6, showing example plots 600, 602, and 604 that simplistically represent the activity of different components of a touch-sensitive display device. Plot 600 represents the operation of the touch-sensitive display, which includes intervals where the display is actively emitting display light, separated by periodic display blanking periods. One such display blanking period is labeled as display blanking period 601. It will be understood that the depicted relationship between display active periods and display blanking periods is deliberately simplified and does not limit the present disclosure.

Similarly, plot 602 illustrates transmission of the data uplink signal over time. In ordinary operation, a touch-sensitive display device may transmit the data uplink signal without regard to current activity of the touch-sensitive display. However, as discussed above, transmission of the data uplink signal can in some cases contribute to display flicker. As such, in this example, the one or more flicker mitigation operations include transmitting the data uplink signal during a display blanking period of the touch-sensitive display, and refraining from transmitting the data uplink signal outside of the display blanking period. This is reflected by plot 602, showing that the uplink signal is transmitted during the display blanking periods, and not transmitted outside of the display blanking periods. This can beneficially reduce or alleviate display flickering, as the data uplink signal is not transmitted while the display is active.

Plot 604 represents activity of the ALS over time. In this example, the ALS is operable in two modes, including an ambient light detection mode and a flicker detection mode. In FIG. 6, periods where the ALS is operating in the ambient light detection mode are colored black, while periods where the ALS is operating in the flicker detection mode have a grey fill pattern. One period in which the ALS is operating in the ambient light detection mode is labeled as 606, while another period in which the ALS is operating in the flicker detection mode is labeled as 608. As shown, in this example, the ALS operates in the ambient light detection mode during blanking intervals of the touch-sensitive display device. This can enable the ALS to accurately estimate the ambient light conditions of the surrounding environment, without being affected by light emitted by the touch-sensitive display device. By contrast, the ALS may operate in the flicker detection mode while the touch-sensitive display is active, enabling the ALS to detect flicker conditions via changes in detected light intensity over time.

In some examples, these two different modes are associated with different integration times. In other words, in some examples, the integration time of the ALS is dynamically controllable, such that a first integration time is used for ambient light detection and a second integration time is used for flicker detection. The second integration time may in some cases be shorter than the first integration time, enabling the ALS to detect rapid fluctuations in light intensity associated with display flicker. This can beneficially enable the ALS to be used both for ambient light sensing and flicker detection, improving the capabilities of the display device without requiring additional hardware components.

Figure 7:
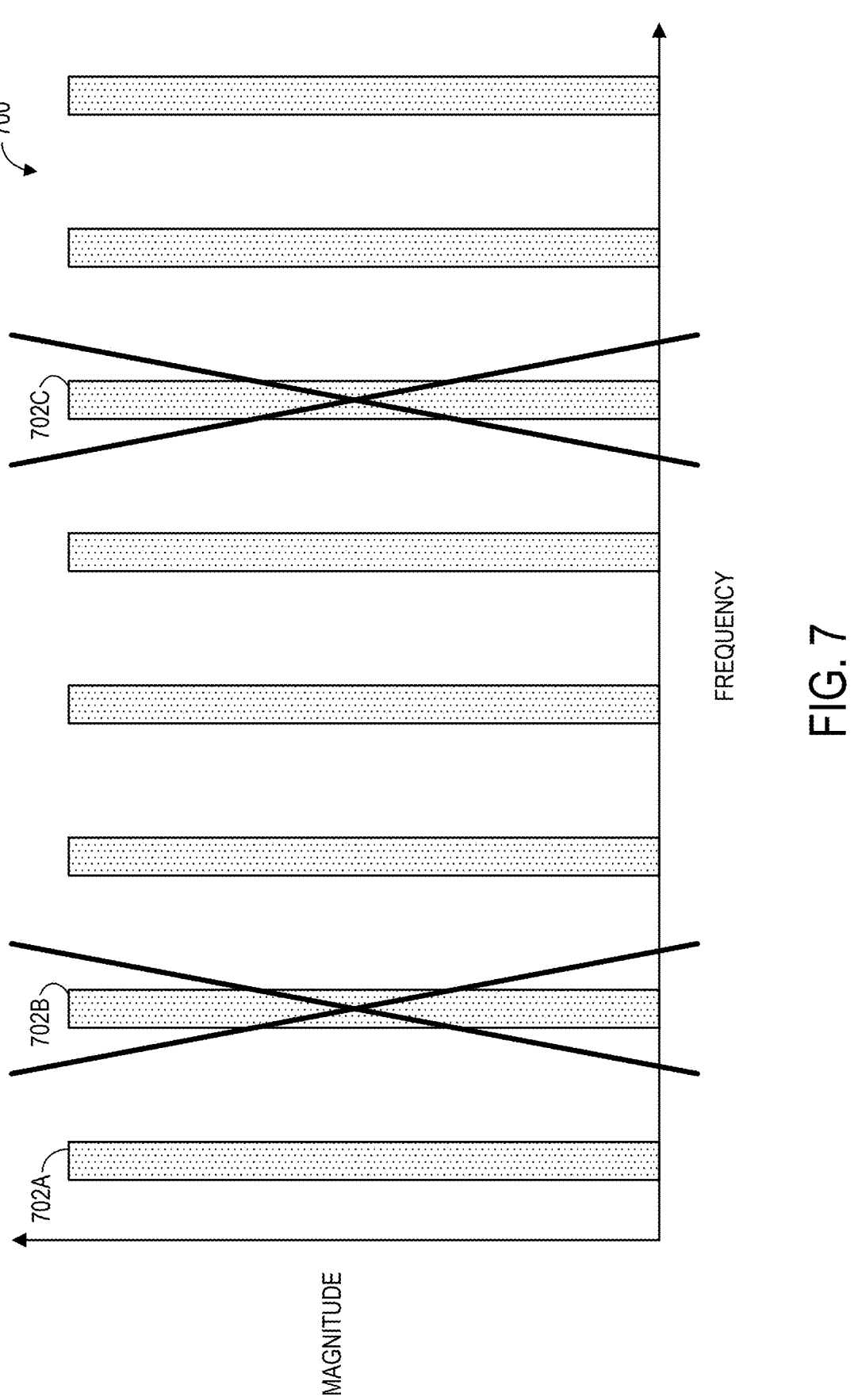
FIG. 7 depicts a plurality of different frequency bands in which a touch-sensitive display may be operated.

Another example flicker mitigation operation is illustrated with respect to FIG. 7. In some examples, the touch-sensitive display device is operable in two or more different multitouch frequency bands. In capacitive touchscreens, signals are sent across the grid of electrodes at specific frequencies to detect touch. These signals may in some cases be modulated in different frequency bands to distinguish between multiple touch points across the display. For instance, different frequency bands may be tuned to optimize the touchscreen's sensitivity and accuracy. Different bands may be used to handle different types of inputs, such as light touches, drags, or taps. Display flicker can be exacerbated when touch detection frequencies overlap with the frequencies used by display electronics or are harmonics of these frequencies. By discontinuing the use of such conflicting frequency bands or adjusting them to non-overlapping values, the interference that contributes to flicker can be significantly reduced.

This is schematically illustrated with respect to FIG. 7, showing a plot 700 representing different frequency bands used by a touch-sensitive display to enable touch-sensing functionality. It will be understood that this representation is highly simplified and provided only for the sake of explanation. As shown, a plurality of different frequency bands are used, three of which are labeled as frequency bands 702A, 702B, and 702C. In this example, a display flicker condition has been detected, and it has been determined that frequency bands 702B and 702C are contributing to the detected flickering. This may be determined, for instance, during a factory calibration process as discussed above. Upon detecting the flicker condition, the touch-sensitive display device may discontinue use of frequency bands 702B and 702C, to thereby reduce or alleviate the display flicker condition. In other words, in this example, applying the one or more flicker mitigation operations includes discontinuing use of one or more multitouch frequency bands.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
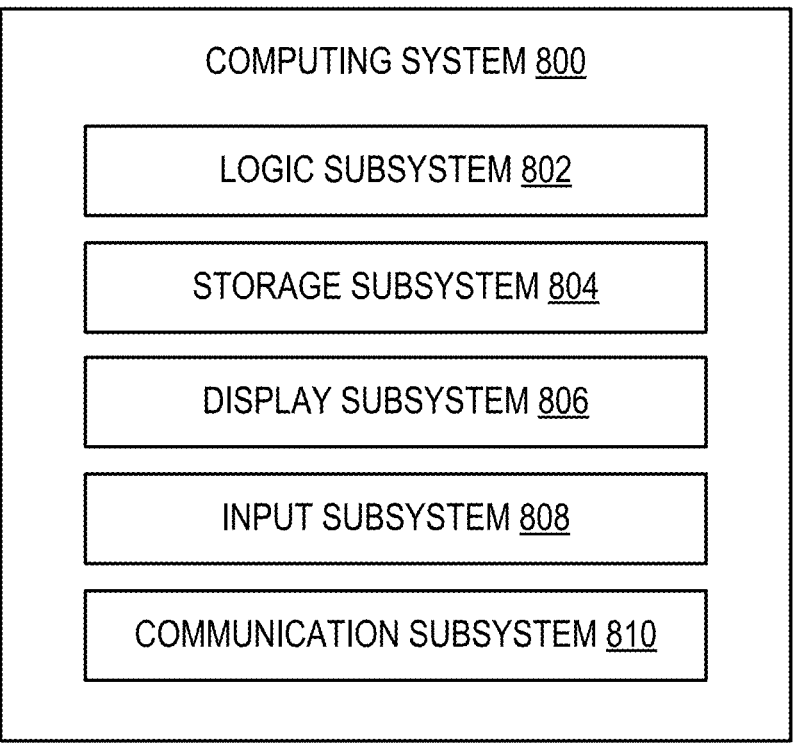
FIG. 8 schematically shows an example computing system.

FIG. 8 schematically shows a simplified representation of a computing system 800 configured to provide any to all of the compute functionality described herein. Computing system 800 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for display flicker mitigation comprises: at an ambient light sensor (ALS) of a touch-sensitive display device, detecting a display flicker condition affecting a touch-sensitive display of the touch-sensitive display device; and applying one or more flicker mitigation operations to alleviate the display flicker condition based at least in part on one or more flicker mitigation parameters. In this example or any other example, the touch-sensitive display is operable in two or more multitouch frequency bands, and wherein applying the one or more flicker mitigation operations includes discontinuing use of at least one of the two or more multitouch frequency bands. In this example or any other example, the touch-sensitive display includes a plurality of display electrodes used to transmit a data uplink signal to an active stylus, and wherein the display flicker condition is caused by transmission of the data uplink signal. In this example or any other example, the one or more flicker mitigation parameters include a detected position of the active stylus relative to the touch-sensitive display, and wherein the one or more flicker mitigation operations include reducing a voltage used for transmission of the data uplink signal at one or more of the plurality of display electrodes having positions greater than a threshold distance from the detected position of the active stylus. In this example or any other example, the one or more flicker mitigation operations include driving a subset of the display electrodes with a second signal having an opposite phase from the data uplink signal. In this example or any other example, a quantity of the subset of the display electrodes driven with the second signal is determined based at least in part on the one or more flicker mitigation parameters. In this example or any other example, the one or more flicker mitigation operations include transmitting the data uplink signal during a display blanking period of the touch-sensitive display, and refraining from transmitting the data uplink signal outside of the display blanking period. In this example or any other example, the plurality of display electrodes include an upper electrode layer and a lower electrode layer, and wherein the one or more flicker mitigation operations include driving display electrodes of the upper electrode layer with the data uplink signal and setting display electrodes of the lower electrode layer to an electrical ground of the touch-sensitive display. In this example or any other example, the one or more flicker mitigation parameters are selected from a group including a size of the touch-sensitive display, a displayed image color of the touch-sensitive display, detected presence of an active stylus in proximity to the touch-sensitive display, and a detected position of a touch input to the touch-sensitive display. In this example or any other example, the ALS is disposed beneath the touch-sensitive display. In this example or any other example, an integration time of the ALS is dynamically controllable, such that the ALS is operable in an ambient light detection mode having a first integration time and operable in a flicker detection mode having a second integration time. In this example or any other example, the ALS operates in the ambient light detection mode during a blanking interval of the touch-sensitive display.

In an example, a touch-sensitive display device comprises: a touch-sensitive display; an ambient light sensor (ALS); and a controller configured to: detect a display flicker condition affecting the touch-sensitive display via the ALS; and apply one or more flicker mitigation operations to alleviate the display flicker condition based at least in part on one or more flicker mitigation parameters. In this example or any other example, the touch-sensitive display is operable in two or more multitouch frequency bands, and wherein applying the one or more flicker mitigation operations includes discontinuing use of at least one of the two or more multitouch frequency bands. In this example or any other example, the touch-sensitive display includes a plurality of display electrodes used to transmit a data uplink signal to an active stylus, and wherein the display flicker condition is caused by transmission of the data uplink signal. In this example or any other example, the one or more flicker mitigation parameters include a detected position of the active stylus relative to the touch-sensitive display, and wherein the one or more flicker mitigation operations include reducing a voltage used for transmission of the data uplink signal at one or more of the plurality of display electrodes having positions greater than a threshold distance from the detected position of the active stylus. In this example or any other example, the one or more flicker mitigation operations include driving a subset of the display electrodes with a second signal having an opposite phase from the data uplink signal. In this example or any other example, the one or more flicker mitigation operations include transmitting the data uplink signal during a display blanking period of the touch-sensitive display, and refraining from transmitting the data uplink signal outside of the display blanking period. In this example or any other example, the ALS is disposed beneath the touch-sensitive display.

In an example, a method for display flicker mitigation comprises: at an ambient light sensor (ALS) of a touch-sensitive display device, detecting a display flicker condition affecting a touch-sensitive display of the touch-sensitive display device, wherein the ALS is disposed beneath the touch-sensitive display, and wherein the display flicker condition is caused by transmission of a data uplink signal to an active stylus; and applying one or more flicker mitigation operations to alleviate the display flicker condition based at least in part on one or more flicker mitigation parameters, including a detected position of the active stylus relative to the touch-sensitive display.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for display flicker mitigation, the method comprising:

at an ambient light sensor (ALS) of a touch-sensitive display device, detecting a display flicker condition affecting a touch-sensitive display of the touch-sensitive display device as fluctuations in display light intensity emitted by the touch-sensitive display device; and responsive to detecting the fluctuations in display light intensity, applying one or more flicker mitigation operations to alleviate the display flicker condition based at least in part on one or more flicker mitigation parameters.

2. The method of claim 1, wherein the touch-sensitive display is operable in two or more multitouch frequency bands, and wherein applying the one or more flicker mitigation operations includes discontinuing use of at least one of the two or more multitouch frequency bands.

3. The method of claim 1, wherein the touch-sensitive display includes a plurality of display electrodes used to transmit a data uplink signal to an active stylus, and wherein the display flicker condition is caused by transmission of the data uplink signal.

4. The method of claim 3, wherein the one or more flicker mitigation parameters include a detected position of the active stylus relative to the touch-sensitive display, and wherein the one or more flicker mitigation operations include reducing a voltage used for transmission of the data uplink signal at one or more of the plurality of display electrodes having positions greater than a threshold distance from the detected position of the active stylus.

5. The method of claim 3, wherein the one or more flicker mitigation operations include driving a subset of the display electrodes with a second signal having an opposite phase from the data uplink signal.

6. The method of claim 5, wherein a quantity of the subset of the display electrodes driven with the second signal is determined based at least in part on the one or more flicker mitigation parameters.

7. The method of claim 3, wherein the one or more flicker mitigation operations include transmitting the data uplink signal during a display blanking period of the touch-sensitive display, and refraining from transmitting the data uplink signal outside of the display blanking period.

8. The method of claim 3, wherein the plurality of display electrodes include an upper electrode layer and a lower electrode layer, and wherein the one or more flicker mitigation operations include driving display electrodes of the upper electrode layer with the data uplink signal and setting display electrodes of the lower electrode layer to an electrical ground of the touch-sensitive display.

9. The method of claim 1, wherein the one or more flicker mitigation parameters are selected from a group including a size of the touch-sensitive display, a displayed image color of the touch-sensitive display, detected presence of an active stylus in proximity to the touch-sensitive display, and a detected position of a touch input to the touch-sensitive display.

10. The method of claim 1, wherein the ALS is disposed beneath the touch-sensitive display.

11. The method of claim 1, wherein an integration time of the ALS is dynamically controllable, such that the ALS is operable in an ambient light detection mode having a first integration time and operable in a flicker detection mode having a second integration time.

12. The method of claim 11, wherein the ALS operates in the ambient light detection mode during a blanking interval of the touch-sensitive display.

13. A touch-sensitive display device, comprising:

a touch-sensitive display;

an ambient light sensor (ALS); and a controller configured to:

detect a display flicker condition affecting the touch-sensitive display via the ALS as fluctuations in display light intensity emitted by the touch-sensitive display device; and responsive to detecting the fluctuations in display light intensity, apply one or more flicker mitigation operations to alleviate the display flicker condition based at least in part on one or more flicker mitigation parameters.

14. The touch-sensitive display device of claim 13, wherein the touch-sensitive display is operable in two or more multitouch frequency bands, and wherein applying the one or more flicker mitigation operations includes discontinuing use of at least one of the two or more multitouch frequency bands.

15. The touch-sensitive display device of claim 13, wherein the touch-sensitive display includes a plurality of display electrodes used to transmit a data uplink signal to an active stylus, and wherein the display flicker condition is caused by transmission of the data uplink signal.

16. The touch-sensitive display device of claim 15, wherein the one or more flicker mitigation parameters include a detected position of the active stylus relative to the touch-sensitive display, and wherein the one or more flicker mitigation operations include reducing a voltage used for transmission of the data uplink signal at one or more of the plurality of display electrodes having positions greater than a threshold distance from the detected position of the active stylus.

17. The touch-sensitive display device of claim 15, wherein the one or more flicker mitigation operations include driving a subset of the display electrodes with a second signal having an opposite phase from the data uplink signal.

18. The touch-sensitive display device of claim 15, wherein the one or more flicker mitigation operations include transmitting the data uplink signal during a display blanking period of the touch-sensitive display, and refraining from transmitting the data uplink signal outside of the display blanking period.

19. The touch-sensitive display device of claim 13, wherein the ALS is disposed beneath the touch-sensitive display.

20. A method for display flicker mitigation, the method comprising:

at an ambient light sensor (ALS) of a touch-sensitive display device, detecting a display flicker condition affecting a touch-sensitive display of the touch-sensitive display device as fluctuations in display light intensity emitted by the touch-sensitive display device, wherein the ALS is disposed beneath the touch-sensitive display, and wherein the display flicker condition is caused by transmission of a data uplink signal to an active stylus; and responsive to detecting the fluctuations in display light intensity, applying one or more flicker mitigation operations to alleviate the display flicker condition based at least in part on one or more flicker mitigation parameters, including a detected position of the active stylus relative to the touch-sensitive display.

* * * * *